(12) United States Patent
Iio et al.

(10) Patent No.: US 7,787,777 B2
(45) Date of Patent: Aug. 31, 2010

(54) OPTICAL PACKET NETWORK SYSTEM

(75) Inventors: Shinji Iio, Musashino (JP); Masayuki Suehiro, Musashino (JP); Katsuya Ikezawa, Musashino (JP); Akira Miura, Musashino (JP); Sadaharu Oka, Musashino (JP); Chie Sato, Musashino (JP); Mamoru Hihara, Musashino (JP); Tsuyoshi Yakihara, Musashino (JP); Shin-ichi Nakajima, Musashino (JP); Morio Wada, Musashino (JP); Daisuke Hayashi, Musashino (JP); Shinji Kobayashi, Musashino (JP); Yoshiyuki Asano, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 521 days.

(21) Appl. No.: 11/502,534

(22) Filed: Aug. 11, 2006

(65) Prior Publication Data
US 2007/0047957 A1  Mar. 1, 2007

(30) Foreign Application Priority Data
Aug. 25, 2005  (JP) ............................. 2005-243646

(51) Int. Cl.
*H04B 10/00* (2006.01)
*H04B 10/20* (2006.01)
(52) U.S. Cl. ............................. 398/180; 398/9; 398/59; 398/97; 398/101; 398/159; 398/175; 398/177
(58) Field of Classification Search .................. 398/37, 398/39, 51, 54, 58, 59, 66, 75, 82, 97, 101, 398/102, 154, 155, 175, 177, 180; 385/12; 259/176
See application file for complete search history.

(56) References Cited

U.S. PATENT DOCUMENTS

| 5,548,431 | A | * | 8/1996 | Shin et al. ...................... 398/59 |
| 5,631,905 | A | * | 5/1997 | Yano ........................... 370/462 |
| 5,831,752 | A | * | 11/1998 | Cotter et al. .................. 398/54 |
| 6,069,720 | A | * | 5/2000 | Cotter et al. ................... 398/1 |
| 6,570,694 | B1 | * | 5/2003 | Yegnanarayanan ........... 398/175 |
| 6,748,175 | B1 | * | 6/2004 | Adams et al. .................. 398/82 |
| 7,024,122 | B2 | * | 4/2006 | Uchiyama et al. ............ 398/155 |
| 7,046,349 | B2 | * | 5/2006 | Everall et al. ............... 356/73.1 |

(Continued)

FOREIGN PATENT DOCUMENTS

JP         2001-36557 A      2/2001

(Continued)

OTHER PUBLICATIONS

Japanese Office Action dated May 6, 2010, issued in corresponding Japanese Patent Application No. 2005-243646.

*Primary Examiner*—Li Liu
(74) *Attorney, Agent, or Firm*—Westerman, Hattori, Daniels & Adrian, LLP

(57) ABSTRACT

An optical packet network system of a ring type, capable of preventing degradation of an optical signal, can be implemented by providing a mechanism relatively simple in structure, capable of erasing light noise if the optical packet signal does not exists. In the optical packet network system made up by interconnecting respective nodes adjacent to each other, and connecting a sending source of an optical packet signal to a ring, a light noise removal function block is provided between the respective nodes adjacent to each other.

4 Claims, 3 Drawing Sheets

U.S. PATENT DOCUMENTS

| | | | |
|---|---|---|---|
| 2002/0025097 A1* | 2/2002 | Cooper et al. | 385/12 |
| 2003/0063860 A1* | 4/2003 | Watanabe | 385/39 |
| 2003/0147374 A1* | 8/2003 | Chiu et al. | 370/349 |
| 2004/0070832 A1* | 4/2004 | Griffin | 359/566 |
| 2004/0114933 A1* | 6/2004 | Shimomura et al. | 398/92 |
| 2006/0222361 A1* | 10/2006 | Aoki | 398/51 |

FOREIGN PATENT DOCUMENTS

| | | |
|---|---|---|
| JP | 2001044944 A | 2/2001 |
| JP | 2003107541 A | 4/2003 |

* cited by examiner

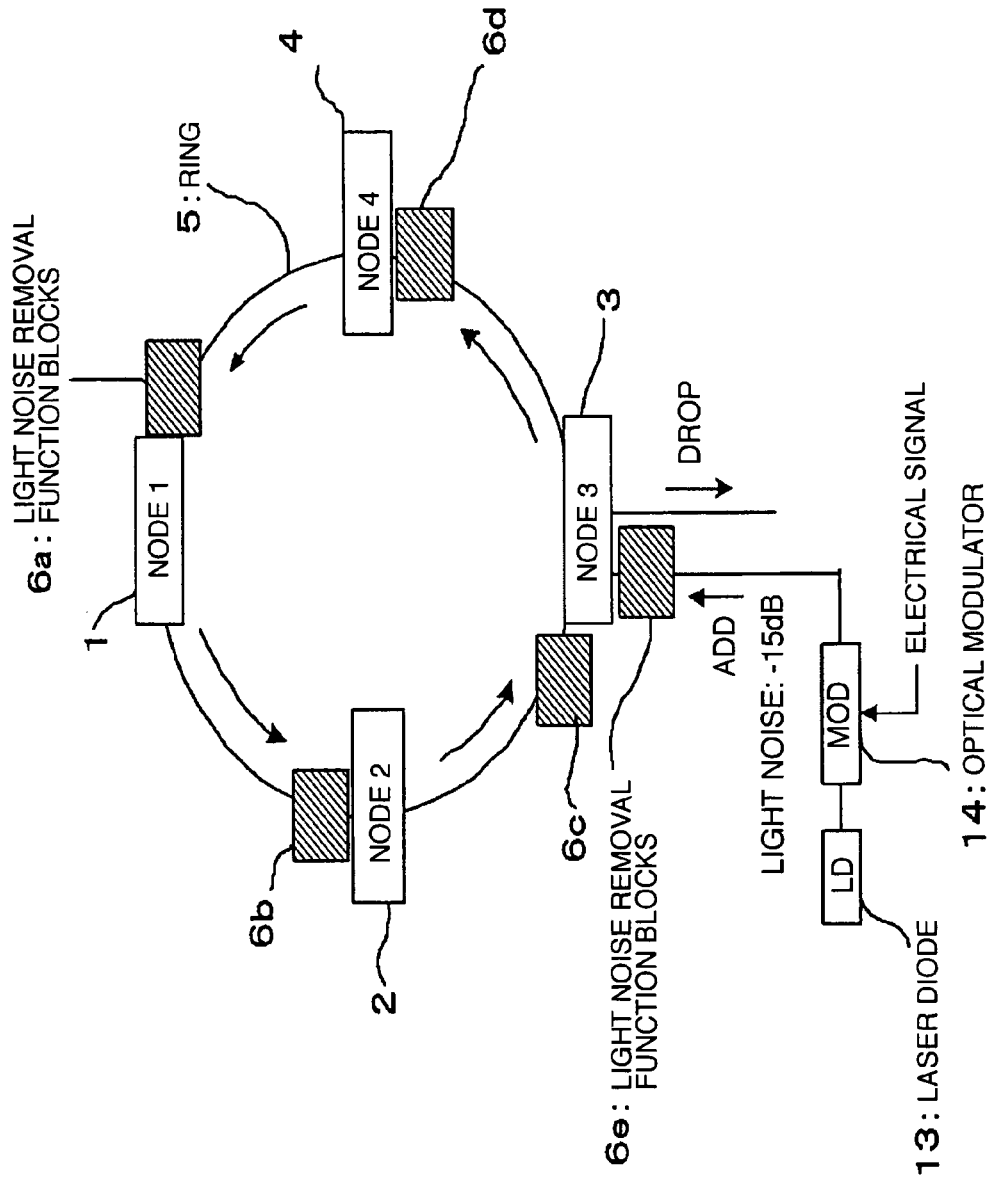

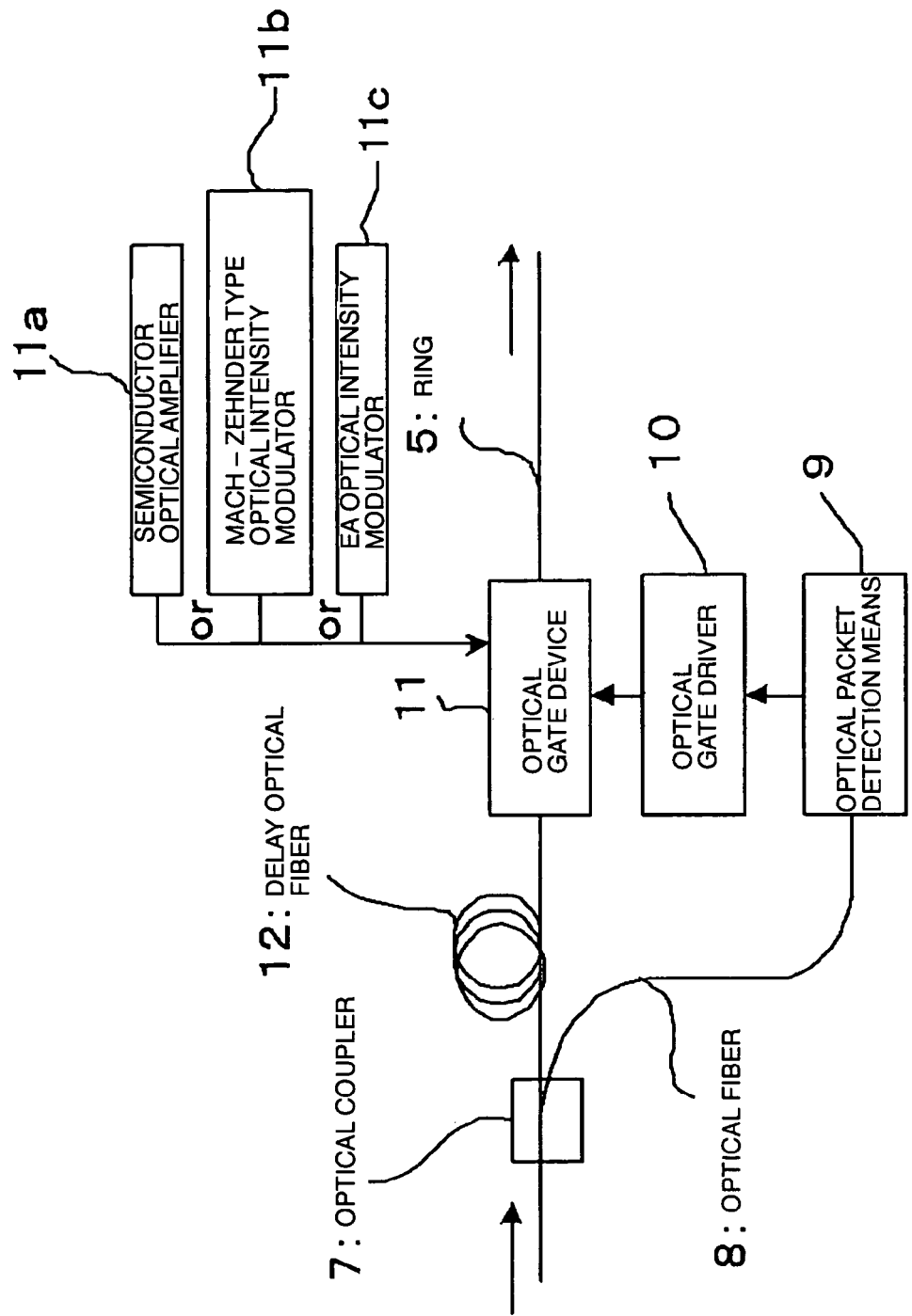

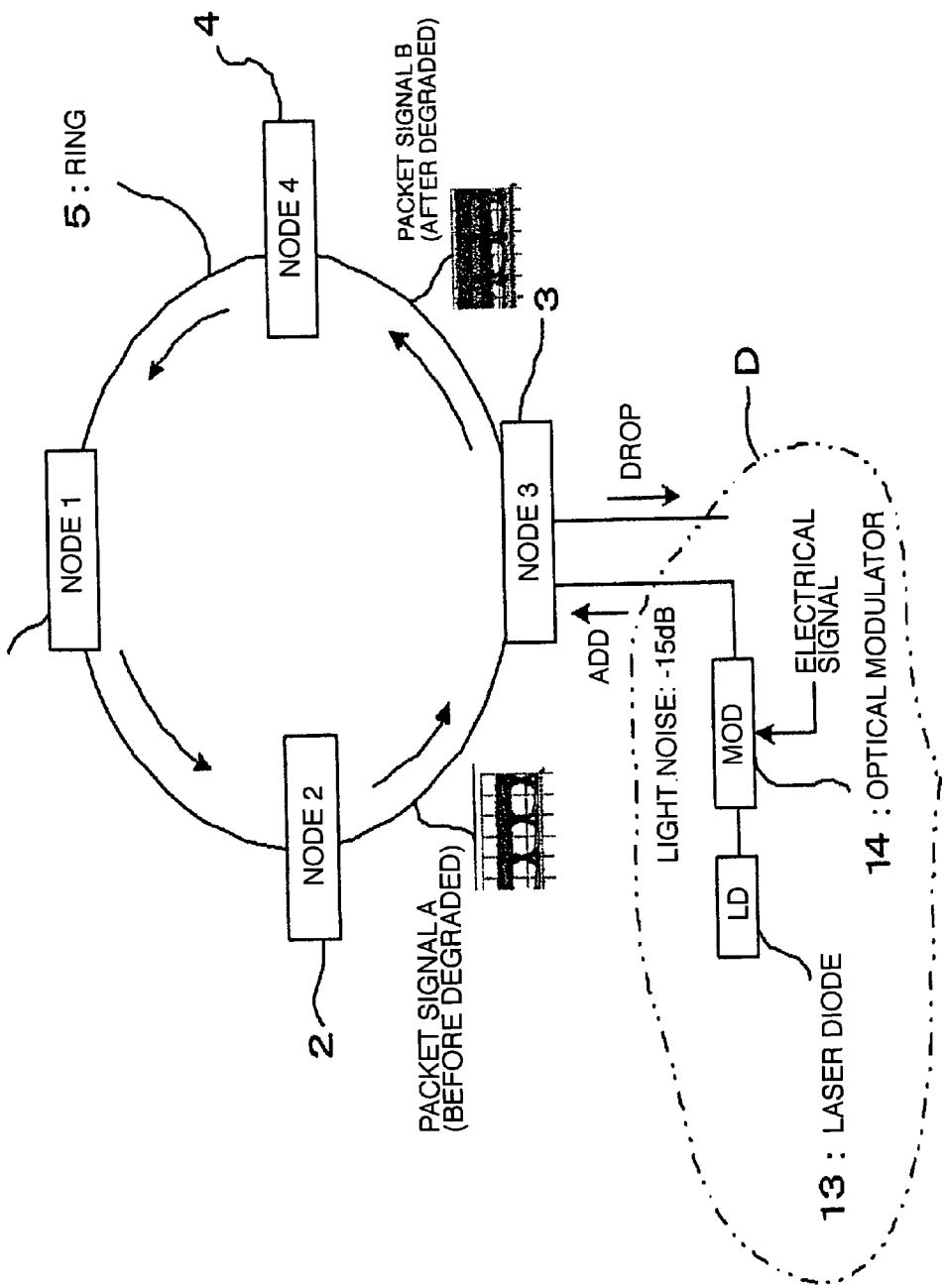

OPTICAL PACKET NETWORK SYSTEM

FIELD OF THE INVENTION

The invention relates to an optical packet network system that is an optical communication network of the next generation, having the function of erasing light noise present in parts thereof, where without an optical signal does not exist.

BACKGROUND OF THE INVENTION

In WAN (Wide Area Network) and LAN (Local Area Network), common use of light as a transmission medium has already been started by now. In some cases as in the case of FTTH (fiber to the home), development has reached a stage where an optical signal is transmitted all the way to individual homes.

With optical communications of today, an optical signal can be branched at a ratio of 1 to N (multitude), which is however still an extension of point-to-point communication, and dynamic optical communications capable of switching an optical signal in a state of light as it is has not yet been put to practical use.

There has been proposed an optical packet network system as a technology for implementing futuristic dynamic optical communications. The technology is represented by a network wherein a data signal is converted into optical packet data to be switched in a state of light without conversion into an electrical signal before reaching a terminal.

FIG. 3 is a block diagram showing a conventional example of an optical packet switching network of a ring type.

The example in FIG. 3 shows a state where four nodes 1 to 4 are connected to a ring 5, and an electrical signal inputted to light at the wavelength of a laser diode 13 via an optical modulator 14 is inputted to the node 3.

Further, with this example, there is shown a state where in the case of light noise from the node 3, at light intensity ratio of −15 dB, being merged (ADD) with an optical packet signal A having passed through the node 2, at the node 3, a signal is degraded due to distortion, as in the case of an optical packet signal B outputted from the node 3. Further, a configuration including the laser diode 13 and the optical modulator 14, in a region of the figure, surrounded by a two-dot chain line D, is similarly provided for the other nodes although not shown in figure.

In general, an extinction ratio not lower than 30 dB is regarded as necessary, but it is deemed considerably difficult to implement such an optical modulator as meets such a specification.

With the optical packet network, it is ideal that an optical signal does not exit at all therein at the time when no signal is transmitted. However, in practice, respective nodes or equipment connected thereto make use of an optical modulator when converting an electrical signal into an optical signal. The conventional example of an optical packet ring network system is disclosed in the following Patent Document 1.

[Patent Document 1] JP 2001-36557 A

SUMMARY OF THE INVENTION

For an optical modulator, use is generally made of a lithium niobate Mach-Zehnder type optical intensity modulator, an InP based EA optical intensity modulator, and so forth, however, with any of those modulators, extinction property (an extinction ratio) at the time when an optical signal is not inputted via a node (at the time of OFF) is found insufficient.

In the case of a common optical modulator, a ratio of a light output at the time of OFF to that at the time of ON (the extinction ratio) is approximately 10 dB, and leakage light at the time of OFF acts as light noise, thereby affecting an optical packet signal.

With the example of the optical packet switching network of the ring type, as shown in FIG. 3, the extinction ratio of the optical modulator for common use is insufficient, so that leakage light at the time of OFF acts as light noise, thereby significantly degrading an optical packet signal. Further, with this example, there is shown a case of the optical signal flowing on a ring side, but there has been a problem in that as in the case where light noise exists on the ring side, and the optical packet signal is added thereto, the optical packet signal similarly undergoes degradation.

It is therefore an object of the invention to implement an optical packet network system of a ring type, provided with a mechanism capable of erasing light noise in the case where there exists no optical packet signal to thereby prevent degradation of an optical signal.

to that end, in accordance with one aspect of the invention, there is provided an optical packet network system made up by interconnecting respective nodes adjacent to each other, and connecting a sending source of an optical packet signal to a ring, wherein a light noise removal function block is provided between the respective nodes adjacent to each other.

With the optical packet network system having those features, the light noise removal function block preferably comprises an optical packet detection means, an optical gate driver and an optical gate device.

Further, for the optical gate device, use may be made of a semiconductor optical amplifier.

Still further, for the optical gate device, use may be made of a lithium niobate Mach-Zehnder type optical intensity modulator.

Yet further, for the optical gate device, use may be made of an EA optical intensity modulator.

As is evident from the foregoing description, the invention has the following advantageous effects.

Because the light noise removal function block is provided between the respective nodes adjacent to each other, it is possible to significantly reduce light noise present in parts of the optical packet network, where an optical packet signal does not exist, thereby deterring degradation of the optical packet signal.

BRIEF DESCRIPTION OF THE DRAWINGS

FIG. 1 is a block diagram of one embodiment of an optical packet network system according to the invention;

FIG. 2 is a block diagram of a light noise removal function block as a component of the optical packet network system according to the invention; and FIG. 3 is a block diagram showing a conventional optical packet switching network system.

PREFERRED EMBODIMENTS OF THE INVENTION

Embodiments of the invention are described in detail hereinafter with reference to the accompanying drawings.

FIG. 1 is a block diagram of one embodiment of the invention, showing a configuration of an optical packet network of a ring type, made up by mounting a light noise removal function block 6 on the conventional example shown in FIG. 3. In this case, the configuration is adopted such that the light noise removal function blocks 6a to 6e are provided between adjacent ones of nodes 1 to 4, and between a sending source of an optical packet signal, and one of the nodes receiving the same, respectively.

FIG. 2 is a block diagram showing a configuration of the light noise removal function block. In the figure, depicted by 5 is a ring made up of an optical fiber, 7 is an optical coupler for bifurcating the optical packet signal.

One of the optical packet signals as bifurcated by the optical coupler 7 propagates through an optical fiber 8 to fall on an optical packet detection means 9.

The optical packet detection means 9 detects a start frame delimiter of the optical packet signal. Depicted by 10 is an optical gate driver disposed in a stage behind the optical packet detection means 9, and 11 is an optical gate device that is turned on/off by the optical gate driver 10.

In the configuration described as above, a signal for opening the optical gate device 11 is sent out to the optical gate driver 10 by the optical packet detection means 9 only if the optical packet detection means 9 detects the start frame delimiter of the optical packet signal, thereby opening the optical gate device 11.

Depicted by 12 is a delay optical fiber, and it is made up such that the optical packet signal reaches the gate in sync with opening of the optical gate device 11 by causing delay by time from detection of the start frame delimiter of the optical packet signal by the optical packet detection means 9 until activation of the optical gate device 11, caused by the optical gate driver 10.

The optical packet detection means 9 is made up such that if a packet size of the optical packet signal is fixed, the optical packet detection means 9 causes the optical gate driver 10 to be activated by a timer so as to close the optical gate device 11 at a time as fixed by the packet size. If the packet size of the optical packet signal is unfixed, the optical packet detection means 9 operates so as to close the optical gate device 11 upon detection of an end frame delimiter, and so forth.

For the optical gate device 11, use should be made of an optical gate device capable of providing a very large extinction ratio. Use can be made of, for example, a semiconductor optical amplifier 11*a* that is pulse-driven, a lithium niobate Mach-Zehnder type optical intensity modulator 11*b*, and an EA optical intensity modulator 11*c*. However, with the lithium niobate Mach-Zehnder type optical intensity modulator 11*b*, and the EA optical intensity modulator 11*c*, respectively, it is generally difficult to obtain a large extinction ratio when used in one stage, so that use is made of any of those modulators, connected in series in, for example, two or more stages as necessary.

With the adoption of the configuration described, it is possible to erase light noise present in parts of the optical packet ring network, where the optical signal does not exist from the first.

Further, the description as stated hereinbefore shows only a specific preferred embodiment for the purpose of explaining the present invention, and showing an example of the embodiments of the present invention.

It is therefore to be understood that the present invention be not limited to the embodiment described in the foregoing, and that the present invention can include many variations and modifications without departing from the spirit and scope thereof. For example, with the embodiment described as above, the light noise removal function blocks 6 are disposed independently from the respective nodes, however, the same can be built inside the respective nodes.

Further, with the embodiment described as above, there is shown a case where the node is provided at four locations by way of example, however, the number of the node to be installed may be optionally changed.

Still further, with the embodiment described as above, there has been shown the configuration of the network of the ring type, however, an advantageous effect of the light noise removal function block is applicable to a configuration of a network of a type other than the ring type, such as a star type, and an extension thereof, that is, a mesh type.

What is claimed is:

1. An optical packet network system connecting a sending source of an optical packet signal to a ring, comprising:
   respective nodes interconnected adjacently to each other on the ring, and a light noise removal function block provided between the respective nodes adjacent to each other to thereby erase light noise where the optical packet signal does not exist in at least a portion of the ring, said light noise removal function block comprises:
   means for splitting the optical packet signal into two parts;
   an optical packet detection means for detecting a start frame delimiter of one part of the optical packet signal;
   an optical gate driver; and
   an optical gate device receiving another part of the optical packet signal via a delay means, wherein a signal for opening said optical gate device is transmitted to said optical gate driver by said optical packet detection means when said optical packet detection means detects said start frame delimiter,
   wherein said optical packet detection means closes the optical gate device by way of a time based on the packet size when the packets transmitted in said optical network are of a fixed size, and by way of detecting an end frame delimiter of the packet when the packets transmitted in said optical network are of an unfixed size.

2. An optical packet network system according to claim 1, wherein the optical gate device is a semiconductor optical amplifier.

3. An optical packet network system according to claim 1, wherein the optical gate device is a lithium niobate Mach-Zehnder type optical intensity modulator.

4. An optical packet network according to claim 1, wherein the optical gate device is an EA optical intensity modulator.

* * * * *